INVENTORS.
POUL B. ROULUND
PETER D. FREEMAN 3,437,279
FILM TRANSPORT SYSTEM
Poul B. Roulund and Peter D. Freeman, Redondo Beach, Calif., assignors to FMA, Inc., Los Angeles, Calif., a corporation of California
Filed Feb. 1, 1967, Ser. No. 613,159
Int. Cl. G11b 15/32
U.S. Cl. 242—55.11          10 Claims

ABSTRACT OF THE DISCLOSURE

The path of a flexible ribbon between storage reels is lengthened during transfer of the first half of the ribbon from one reel to the other and is shortened during transfer of the second half of the ribbon from the one reel to the other. The reels are driven at the same angular velocity and have hubs with a large diameter relative to the ribbon length. A guide roller in the film path is mounted on a movable spring-loaded member that results in the shortest ribbon path when the spring is fully loaded. As the free end of the ribbon is threaded along the path between reels, the movable member is initially set so the spring is substantially loaded.

Background of the invention

This invention relates to a technique for handling a flexible ribbon of material such as film or tape and, more particularly, to a system for transporting film or tape past a predetermined point, at which it is utilized in some way.

A flexible ribbon of material such as film or tape is commonly employed as a storage medium for information in various forms. Analog and digital data, for example, is often stored on either photographic film, magnetic tape, or paper tape, while graphic information is stored on photographic film. Usually the film or tape is wrapped around the hub of a supply reel for storage. In use, the film is unwound from the supply reel, transported past a utilization device, and then wound onto a take-up reel. As the film is transferred from one reel to the other in this fashion, the difference between the circumferences of the outer layer of the film on the two reels varies continuously. Accordingly, the difference between the length of film unwound from the supply reel and the length of film wound onto the take-up reel per reel revolution changes continuously as the ribbon is transported. During transfer of the first half of the length of film from the supply reel to the take-up reel, the film unwinds from the supply reel at a faster rate, i.e., feet of length per revolution, than it is wound on to the take-up reel. Conversely, during transfer of the second half of the length of film from the supply reel to the take-up reel, the film winds onto the take-up reel at a faster rate than it unwinds from the supply reel. To prevent the film from becoming so slack as to leave the film guides during transfer of the first half of the film between reels and from becoming so taut as to break during transfer of the second half of the film between reels, the reels are driven at different angular velocities, with the result that essentially the same length of film is continuously unwound from the supply reel as is wound onto the take-up reel. Therefore, the tension on the film does not vary significantly in the course of film transport. The proper angular velocities are obtained by driving the reels with slip clutches, servomotors, or some other rather elaborate drive arrangement. Frequently, a sprocket or capstan drive for directly controlling film transport past the utilization device is found necessary in addition to the reel drive arrangement.

Summary of the invention

According to the invention, the path of a flexible ribbon between storage reels is lengthened during transfer of the first half of the ribbon from one reel to the other and is shortened during transfer of the second half of the ribbon from the one reel to the other. This permits the utilization of a reel drive arrangement that rotates the reels at the same angular velocity at least during intervals of time in the course of the transfer of ribbon between reels. Most advantageously, the reel hubs around which the ribbon is wrapped have a very large diameter so the difference in circumference between the outermost layer of ribbon on each of the two hubs remains small as the ribbon is transferred between reels. In such case, the reels may be driven at the same angular velocity during the entire time the ribbon is being transferred between reels.

In particular, the ribbon passes over a film guiding element, e.g., a guide roller, in its path between reels. The guide roller is mounted on a movable spring-loaded member arranged to form the shortest ribbon path when the spring is fully loaded. When the end of the ribbon stored on one of the reels is threaded along the ribbon path to the other reel, the movable member is initially set so the spring is substantially loaded. Consequently, the spring is unloaded and the path lengthens as the first half of the length of the ribbon is transferred between reels, after which the spring is loaded again and the path shortens as the second half of the length of the ribbon is transferred between reels.

Brief description of the drawing

The features of a specific embodiment of the invention are illustrated in the drawing, in which.

Description of a specific embodiment

Figure 1:
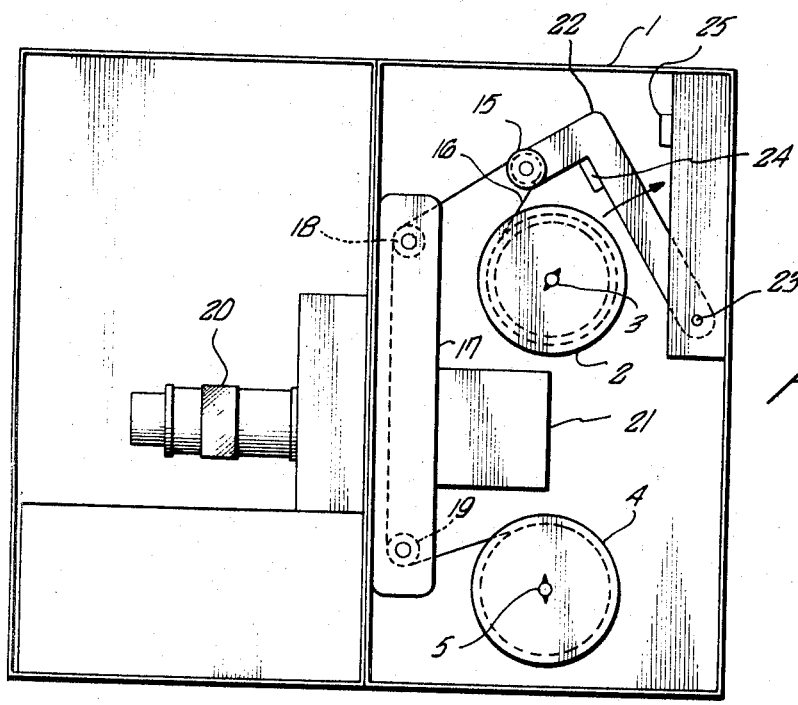
FIG. 1 is a front elevation view of a film projector using a system embodying the principles of the invention.
Figure 2:
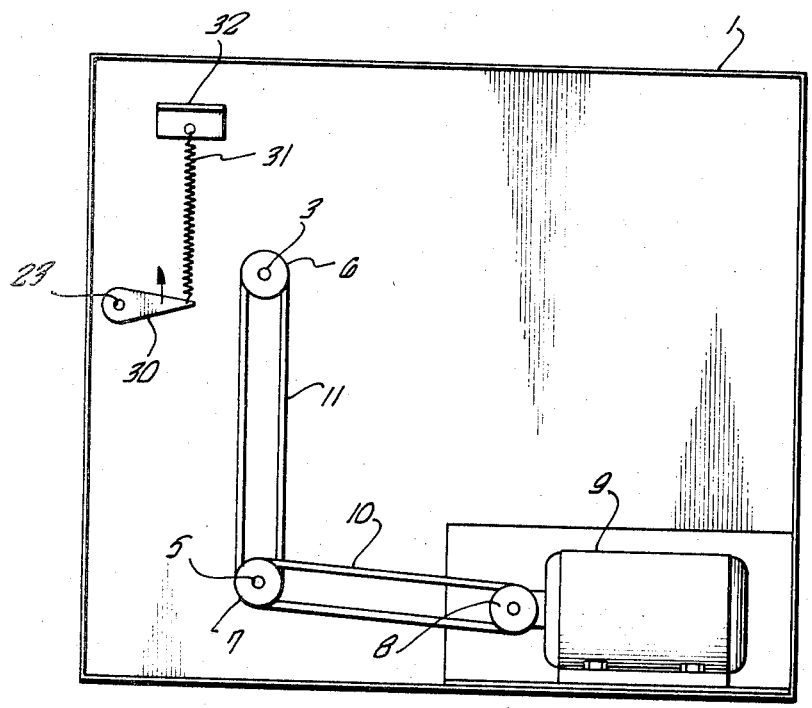
FIG. 2 is a rear elevation view of the film projector of FIG. 1.

In the drawing, a film projector is shown that is mounted on a frame 1. As illustrated in FIG. 1, a supply reel 2 is mounted on a rotatable shaft 3 and a take-up reel 4 is mounted on a rotatable shaft 5 in front of frame 1. As illustrated in FIG. 2, shafts 3 and 5, which pass through frame 1, have pulleys 6 and 7, respectively, attached to them in back of frame 1. A pulley 8 is attached to the drive shaft of a motor 9. Rotational motion is coupled from motor 9 to shaft 5 by an endless belt 10 wrapped around pulleys 7 and 8. Similarly, rotational motion is coupled from shaft 5 to shaft 3 by an endless belt 11 wrapped around pulley 6 and a pulley (not shown) attached to shaft 5 behind pulley 7. As a result, reels 2 and 4 rotate in the same direction of rotation and at the same angular velocity when driven by motor 9. The pulleys and belts could be splined if desired to insure a more positive coupling between the drive shaft of motor 9, shaft 5, and shaft 3.

Reference is now made once again to FIG. 1, in which a flexible ribbon 16 of film is shown extending along a film path between reels 2 and 4. In its path, the film passes over a guide roller 15 and through a projection housing 17. Guide rollers 18 and 19 within housing 17 direct ribbon 16 past a point between a lens 20 and projection apparatus 21, which could include a lamp and a condenser system. Ribbon 16 is transported by rotation of reels 2 and 4 themselves. No sprocket or capstan drive is provided. Guide roller 15 is mounted on one end of a pivot arm 22 that is attached at the other end to a rotatable shaft 23 passing through frame 1. Blocks 24 and 25, which are attached to frame 1, serve as stops on the travel of pivot arm 22.

On the back of frame 1, a lever 30 (FIG. 2) is attached to shaft 23. A compression spring 31 is connected between lever 30 and a bracket 32 that is attached to frame 1. Guide roller 15, pivot arm 22, shaft 23, and spring 31 are arranged such that the shortest film path is formed when spring 31 is fully loaded, that is, fully expanded, and pivot arm 22 is up against block 24. As arm 22 pivots in a clockwise direction as viewed from FIG. 1, the film path is lengthened and spring 31 becomes unloaded, i.e., compresses.

In operation, when all the film is stored on reel 2 and it is desired to transfer the film to reel 4, the free end of the film is threaded along its path with pivot arm 22 set such that spring 31 is initially fully loaded. Therefore at the start, the shortest film path is formed, as illustrated in FIG. 1. As one half of the length of film is transferred from 2 to reel 4, pivot arm 22 gradually rotates clockwise, thereby lengthening the film path and taking up the slack until the midpoint of the film is reached. Thereafter, pivot arm 22 gradually rotates counterclockwise as the other half of the length of film is transferred to reel 4, thereby shortening the film path once again and feeding out the extra film to reel 4. The tension on the film is maintained within prescribed limits—large enough to prevent the film from becoming slack and small enough to prevent breakage of the film. The same operation takes place when the film is rewound from reel 4 to reel 2.

The hubs of reels 2 and 4 have a very large diameter so the difference in circumference between the outermost layer of film on reels 2 and 4 remains relatively small as the film is transferred therebetween. Accordingly, the difference in path length required of pivot arm 22 is not too large to be implemented practicably. By way of example, a 30-foot length of film of average thickness can be completely transferred from one reel to the other with ease while the reels are driven the entire time at the same angular velocity. With a hub diameter of 4½ inches, the length of the film path must only change by about 6 inches during the transfer. The tension of spring 31 is not particularly critical. It should be sufficiently large to permit stopping and starting without causing the film to become slack, but not too large as to cause undue film wear.

Since reels 2 and 4 rotate at the same angular velocity, they could be replaced by a single reel having a sufficiently wide hub to store the supply and take-up film in side-by-side relationship.

Instead of a guide roller mounted on a spring-loaded pivot arm, the film path length adjustment could be carried out by a vacuum column structure. In such case, the free end of the film is threaded along its path, forming the smallest possible loop in the vacuum column. As the first half of the film is transferred, the force of the vacuum draws the extra film down in the vacuum column to lengthen the loop. As the second half of the film is transferred, the extra film is pulled out of the vacuum column to return the loop to its initial length.

If longer lengths of film are to be used, the principles of the invention can still be employed without increasing the arc of travel of pivot arm 22 by driving the reels at the same angular velocity during certain intervals of time separated by other intervals of time in which the reels are driven at different angular velocities. During the latter intervals, the reels could be driven to change the length of the film path in the opposite direction from the change of length occurring during the intervals in which the reels are driven at the same angular velocity.

What is claimed is:
1. A system for transporting a ribbon of flexible material comprising: a first hub surface area for storing a ribbon of flexible material; a second hub surface area for storing a ribbon of flexible material; ribbon guiding means defining a ribbon path between the first and second hub surface areas; a single motor directly coupled to the first and second hub surface areas to drive them substantially in synchronism in a rotational direction so as to transfer ribbon between them; and means for lengthening the path during transfer of the first half of ribbon between hub surface areas and shortening the path during transfer of the second half of ribbon between hub surace areas.

2. The transport system of claim 1, in which the ribbon guiding means includes a guiding element and the lengthening and shortening means comprises a movable spring-loaded member on which the guiding element is mounted, the member being adapted to change the length of ribbon path as it moves and to form the shortest ribbon path when the spring is fully loaded.

3. The transport system of claim 2, in which the member is a pivot arm loaded by a compression spring arranged such that the shortest ribbon path is formed when the spring is fully expanded.

4. The transport system of claim 2, in which the guiding element is a guide roller.

5. The transport system of claim 1, in which the hub surface areas are on two separate storage reels and the motor drives both reels substantially in synchronism.

6. A system for transporting a ribbon of flexible material comprising: a first hub surface area; a second hub surface area; a flexible ribbon of material wound around the first hub hurface area and guided along a path to the second hub surface area around which the free end of the ribbon is wrapped, the diameter of the hub surface areas being large so the difference in circumference between the outer layer of the ribbon on the hub surface areas remains small; means for rotating the hub surface areas at substantially the same angular velocity during transfer of all of the ribbon; and means for lengthening the path during the transfer of the first half of the ribbon from the first hub surface area to the second hub surface area sufficiently to take up the excess of the ribbon unwound from the first hub surface area and for shortening the path during transfer of the second half of the ribbon between the first hub surface area and the second hub surface area sufficiently to feed out the deficiency of the ribbon unwound from the first hub surface area.

7. The transport system of claim 6, in which the lengthening and shortening means is a guide roller located in the path of the ribbon, the guide roller being rotatably mounted on a spring-loaded member that is movable to change the path length, the member being arranged so the roller provides the minimum path length when the spring is fully loaded.

8. The transport system of claim 7, in which the member is positioned to form the minimum ribbon path when substantially all the ribbon is stored on one of the hub surface areas.

9. The transport system of claim 1, in which the ribbon is transported along the path exclusively by the force the rotating hub surface areas exert on the ribbon.

10. A method for transporting a flexible ribbon of material between two hub surface areas along a path that includes a guiding element mounted on a movable spring-loaded member, the member being adapted to form a minimum ribbon path length when the spring is fully loaded and to form an increasing length as the spring unloads, all of the ribbon being wound on one of the hub surface areas, comprising the steps of: threading the free end of the ribbon along the ribbon path between the hub surface areas initially positioning the member with the spring of the member substantially fully loaded; and rotating the hub surface areas at substantially the same angular velocity during the entire transport operation so the path length increases during transport of the first half of the ribbon and decreases during transport of the second half of the ribbon.

References Cited

UNITED STATES PATENTS 3,022,960   2/1962   Foster _____ 242—75.3
3,172,611   3/1965   Harris _____ 242—55.12

GEORGE F. MAUTZ, Primary Examiner.

U.S. Cl. X.R.

242—75.3